(12) United States Patent
Kim

(10) Patent No.: US 9,445,063 B2
(45) Date of Patent: Sep. 13, 2016

(54) FIBER SCANNING PROJECTOR

(71) Applicant: SAMSUNG ELECTRONICS CO., LTD., Suwon-si (KR)

(72) Inventor: Woon-bae Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 199 days.

(21) Appl. No.: 14/178,835

(22) Filed: Feb. 12, 2014

(65) Prior Publication Data

US 2014/0232993 A1    Aug. 21, 2014

(30) Foreign Application Priority Data

Feb. 15, 2013    (KR) .................... 10-2013-0016599

(51) Int. Cl.
*H04N 9/31* (2006.01)
*G02B 26/10* (2006.01)
*G03B 21/20* (2006.01)

(52) U.S. Cl.
CPC .......... *H04N 9/3129* (2013.01); *G02B 26/103* (2013.01); *H04N 9/3173* (2013.01); *G03B 21/2033* (2013.01)

(58) Field of Classification Search
CPC .. H04N 9/3129; H04N 9/3135; G02B 26/10; G02B 6/262; G02B 26/103; G03B 21/2033; G03B 21/20; A61B 1/00172
See application file for complete search history.

(56) References Cited

U.S. PATENT DOCUMENTS

| | | | |
|---|---|---|---|
| 5,727,098 A * | 3/1998 | Jacobson | G02B 26/10 385/22 |
| 6,964,483 B2 | 11/2005 | Wang et al. | |
| 7,036,938 B2 | 5/2006 | Wang et al. | |
| 8,073,526 B2 | 12/2011 | Graham et al. | |
| 2009/0316116 A1* | 12/2009 | Melville | A61B 1/0008 353/31 |
| 2010/0168515 A1* | 7/2010 | Sugimoto | A61B 1/0008 600/109 |

FOREIGN PATENT DOCUMENTS

| | | | |
|---|---|---|---|
| KR | 10-2005-0039097 A | 4/2005 |
| KR | 10-2007-0061607 A | 6/2007 |
| KR | 10-2011-0056155 A | 5/2011 |
| KR | 10-2012-0042404 A | 5/2012 |

* cited by examiner

*Primary Examiner* — William C Dowling
*Assistant Examiner* — Ryan Howard
(74) *Attorney, Agent, or Firm* — Sughrue Mion, PLLC

(57) ABSTRACT

A fiber scanning projector includes a light source comprising a plurality of monochromatic light sources, a modulator providing a modulation signal according to image information to the light source, a scanner scanning a screen with a light emitted from the light source and controlled according to the modulation signal, the scanner including a fiber bundle and an actuator which 2-axis-drives the fiber bundle, and a synchronization controller synchronizing driving of the actuator and driving of the modulator.

19 Claims, 5 Drawing Sheets

FIBER SCANNING PROJECTOR

CROSS-REFERENCE TO RELATED APPLICATIONS

This application claims priority from Korean Patent Application No. 10-2013-0016599, filed on Feb. 15, 2013, in the Korean Intellectual Property Office, the disclosure of which is incorporated herein in its entirety by reference.

BACKGROUND

1. Field

Methods and apparatuses consistent with the exemplary embodiments relate to subminiature projectors in a fiber scanning scheme, and a fiber scanning projector which has a high light efficiency by using a scheme of scanning each pixel with a plurality of monochromatic light sources, and adopts a 2-axis-driving fiber scanning scheme.

2. Description of the Related Art

A projector is a device for modulating a light according to a video signal, and projecting the modulated light onto a screen. According to a light modulating device, projectors are classified into a digital light processing (DLP) projector, a liquid crystal on silicon (LCOS) projector, a microelectromechanical system (MEMS)-based pico projector, or the like. In addition, according to the number of employed light modulating devices, projectors are also classified into a single panel type projector or a three panel type projector.

The three panel type projector includes a plurality of dichroic mirrors which divide a white light into red, green, and blue lights, a plurality of display panels, and a color synthesizing unit. That is, due to a great number of employed optical components, the three panel type projector has a bulky structure.

The single panel type projector uses a light source for emitting a white light, and a color wheel for time-sequentially dividing the emitted white light into red, green, and blue lights, thereby reducing light efficiency and causing color break-up.

Recently, with the development of a subminiature projector which has a portable size, a projector structure capable of minimizing a projecting device as well as improving light efficiency and color quality has been researched.

SUMMARY

Provided are subminiature projectors in a fiber scanning scheme.

Additional aspects will be set forth in part in the description which follows and, in part, will be apparent from the description, or may be learned by practice of the presented exemplary embodiments.

According to an aspect of the exemplary embodiments, a fiber scanning projector includes: a light source comprising a plurality of monochromatic light sources; a modulator configured to provide a modulation signal according to image information to the light source; a scanner configured to scan a screen with a light emitted from the light source and configured to be controlled according to the modulation signal, the scanner comprising a fiber bundle and an actuator configured to 2-axis-drive the fiber bundle; and a synchronization controller configured to synchronize the driving of the actuator and the driving of the modulator.

The actuator may include: a plurality of piezoelectric strips adhered to a surface of the fiber bundle; and a power supply configured to supply an electric signal to selected some of the plurality of piezoelectric strips.

The plurality of piezoelectric strips may include: a pair of first piezoelectric strips arranged to face each other on a side surface of the fiber bundle to modify one end of the fiber bundle in a first direction; and a pair of second piezoelectric strips arranged at positions rotationally displaced from the pair of first piezoelectric strips by 90 degrees to modify the one end of the fiber bundles in a second direction perpendicular to the first direction.

The pairs of first and second piezoelectric strips respectively may have a piezoelectric film, and first and second electrodes formed respectively on both surfaces of the piezoelectric film.

The actuator may have a tube form having a through hole through which the fiber bundle passes.

The actuator may include: a piezoelectric cylinder shell formed of a piezoelectric material; an inner electrode having a cylinder shell shape formed on an inner cylindrical surface of the piezoelectric cylinder shell; and four outer electrodes formed on an outer cylindrical surface of the piezoelectric cylinder shell and separated from each other.

The fiber scanning projector may further include: a varifocal lens arranged on an optical path of a light emitted from the scanner.

The fiber scanning projector may further include: an asymmetric structure mounted on one side of the fiber bundle and having different moments of inertia with respect to two directions of the 2-axis-driving.

The asymmetric structure may have a shape having a hole or a groove through which the fiber bundle passes.

The asymmetric structure may have a symmetric cross-sectional shape and an non-uniform thickness.

The asymmetric structure may have an asymmetric cross-sectional shape and a uniform thickness.

The asymmetric structure may have a cylinder shape having a through hole formed at a position deviated from a center portion.

The asymmetric structure may have an elliptical cylinder shape having a through hole formed at a center portion.

The asymmetric structure may be formed of a silicon material.

The fiber scanning projector may further include a case having an inner space in which the light source and the scanner are disposed, and an output portion outputting a light from the scanner disposed on one end of the case.

The fiber scanning projector may further include a varifocal lens mounted on the output portion.

The fiber scanning projector may further include a touch pen for a touch pad on another end opposite to the one end of the case.

A circuit unit configuring the modulator and the synchronization controller may be arranged in the inner space of the case.

A circuit unit configuring the modulator and the synchronization controller may be embedded in a mobile device separated from the case and remotely drives the light source and the actuator.

According to another aspect of the exemplary embodiments, a fiber scanning 3-dimensional (3D) image projector includes: a plurality of fiber scanning projectors, wherein the modulators of the plurality of fiber scanning projectors respectively provide different image signals for forming a 3D image.

The plurality of fiber scanning projectors may include: a fiber scanning projector for a left eye forming a left image of first polarization; and a fiber scanning projector for a right eye forming a right image of second polarization.

The plurality of fiber scanning projectors may be arrayed in the number of 3 or more, and respectively project different view point images.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
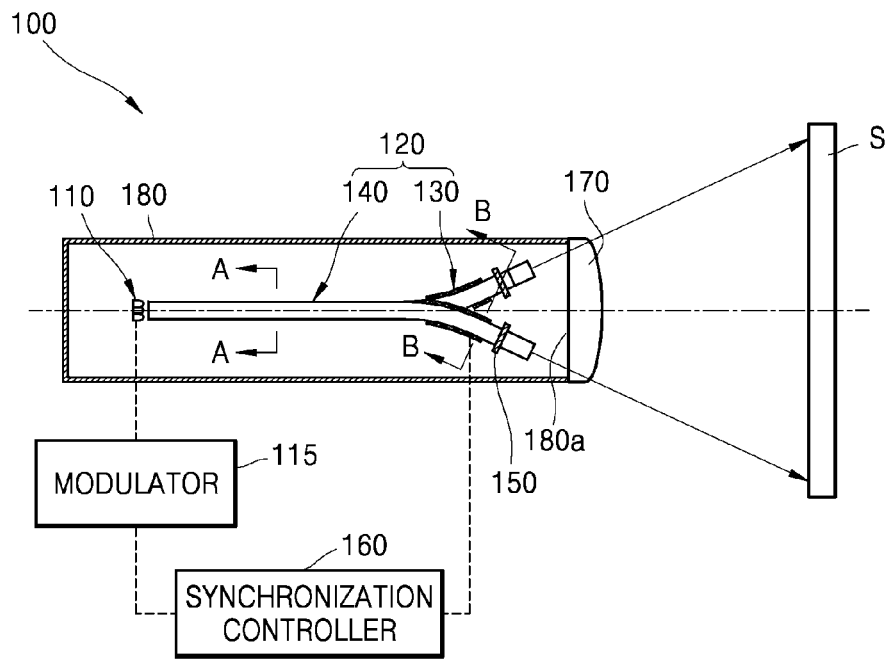
FIG. 1 is a cross-sectional view illustrating a schematic configuration of a fiber scanning projector according to an exemplary embodiment.

Reference will now be made in detail to exemplary embodiments, examples of which are illustrated in the accompanying drawings, wherein like reference numerals refer to like elements throughout. In the drawings, the sizes of the elements are exaggerated for clarity of illustration and are not limited to illustrated shapes.

In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

Figure 2:
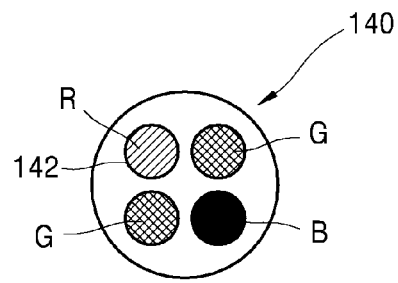
FIG. 2 is a cross-sectional view taken along line A-A in FIG. 1.
Figure 3:
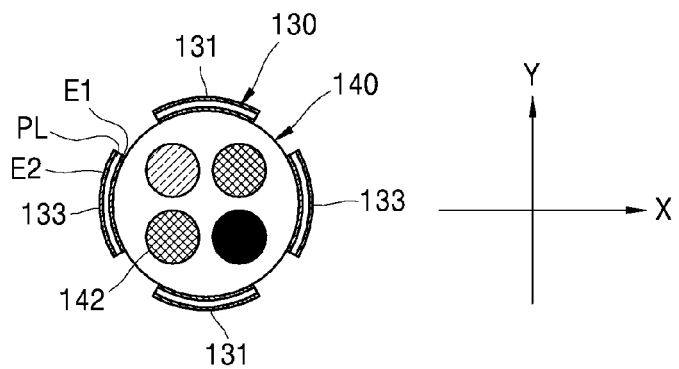
FIG. 3 is a cross-sectional view taken along line B-B in FIG. 1.
Figure 5A:
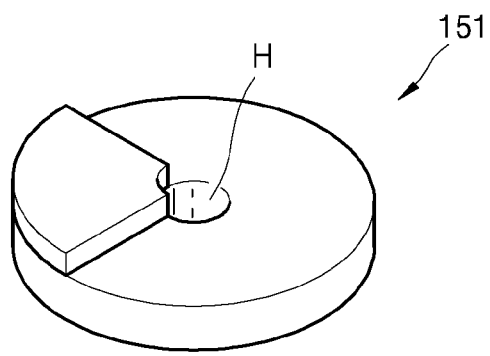
FIGS. 5A to 5C show exemplary shapes of an asymmetric structure included in the fiber scanning projector in FIG. 1.
Figure 5B:
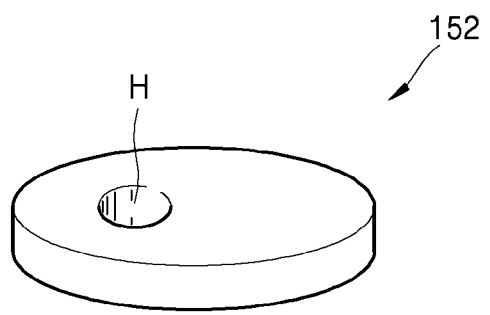
Figure 5C:
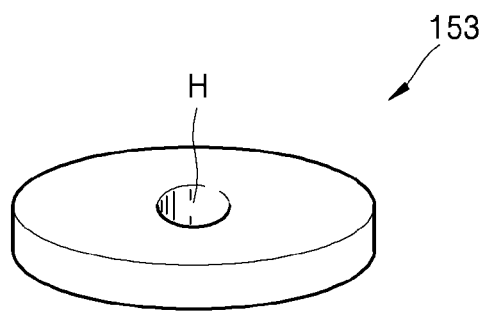

FIG. 1 is a cross-sectional view of a schematic configuration of a fiber scanning projector 100 according to an exemplary embodiment, FIG. 2 is a cross-sectional view taken along line A-A in FIG. 1, and FIG. 3 is a cross-sectional view taken along line B-B in FIG. 1. FIGS. 5A to 5C illustrate exemplary shapes of an asymmetric structure included in the fiber scanning projector 100 in FIG. 1.

Referring to FIG. 1, the fiber scanning projector 100 includes a light source 110 including a plurality of monochromatic light sources, a modulator 115 providing a modulation signal to the light source 110 according to image information, a scanner 120 including a fiber bundle 140 and an actuator 130 which two-axis-drives the fiber bundle 140, and scanning a screen S which displays a light emitted from the light source 110 controlled according to the modulation signal output from the modulator 115, and a synchronization controller 160 which synchronizes the driving of the actuator 130, and the driving of the modulator 115.

In addition, the fiber scanning projector 100 may further include a varifocal lens 170 arranged on an optical path of a light output from the scanner 120.

The fiber scanning projector 100 may further include a case 180 having a predetermined inner space, one end thereof being a light output portion 180a, and the light source 110 and the scanner 120 may be disposed in the inner space of the case 180. The varifocal lens 170 may be mounted on the light output portion 180a of the case 180.

Also, the light source 110, a battery for driving the actuator 130, or a configuration for connection to an external power supply may be disposed inside the case 180.

The light source 110 may include a light-emitting diode (LED) or a laser source, or may include a plurality of monochromatic light sources, for example, R, G, B light sources.

The fiber bundle 140 is prepared for transferring a light emitted from the light source 110 to a desired position. The fiber bundle 140 may include a plurality of fibers 142. That is, the plurality of fibers 142 are prepared to correspond to the plurality of monochromatic light sources so that a single pixel is formed of a combination of the plurality of monochromatic lights. Referring to FIG. 2, four fibers 142 are illustrated to respectively transmit R, G, B lights, as an example. A single pixel may be realized with another number of fibers, or a combination of other monochromatic lights. This single pixel may be projected onto a designated position in a combination type where some of the plurality of monochromatic light sources are selectively turned on/off and combined according to a signal provided by the modulator 115.

The actuator 130 is prepared to modify the fiber bundle 140 in order that the light transferred by the fiber bundle 140 is projected onto a designated pixel position on the screen S. That is, the actuator 130 is formed to 2-axis-drive the fiber bundle 140 so that one end of the fiber bundle 140 can be modified in two directions, for example, X-axis and Y-axis directions. The actuator 130 may be, for example, a piezoelectric actuator using a piezoelectric material in which modification occurs according to an electric signal. The actuator 130 may include a plurality of piezoelectric strips adhered to a surface of the fiber bundle 140, and a power supply (not shown) supplying an electric signal to a selected portion of the plurality of piezoelectric strips.

Referring to FIG. 3, the plurality of piezoelectric strips may include a pair of first piezoelectric strips 131 and a pair of second piezoelectric strips 133. The first piezoelectric strips 131 are arranged to oppose each other at a side surface of the fiber bundle 140, and modify one end of the fiber bundle 140 in a first direction, for example, a Y-axis direction. The second piezoelectric strips 133 modify the one end of the fiber bundle 140 in a second direction perpendicular to the first direction, for example, an X-axis direction, and are arranged at a rotationally displaced position by 90 degrees from the first piezoelectric strips 131. The pairs of first and second piezoelectric strips 131 and 133 may respectively include a piezoelectric film formed of a material causing modification according to an electric signal, and an electric structure applying a voltage to the piezoelectric film. As illustrated, the pairs of first and second piezoelectric strips 131 and 133 may respectively include a piezoelectric film PL, and first and second electrodes E1 and E2 respectively formed on both surfaces of the piezoelectric film PL. The piezoelectric film PL may include, for example, Lead Zirconate Titanate (PZT) material, and have a single layer film structure or a multi-layer film structure.

Figure 4A:
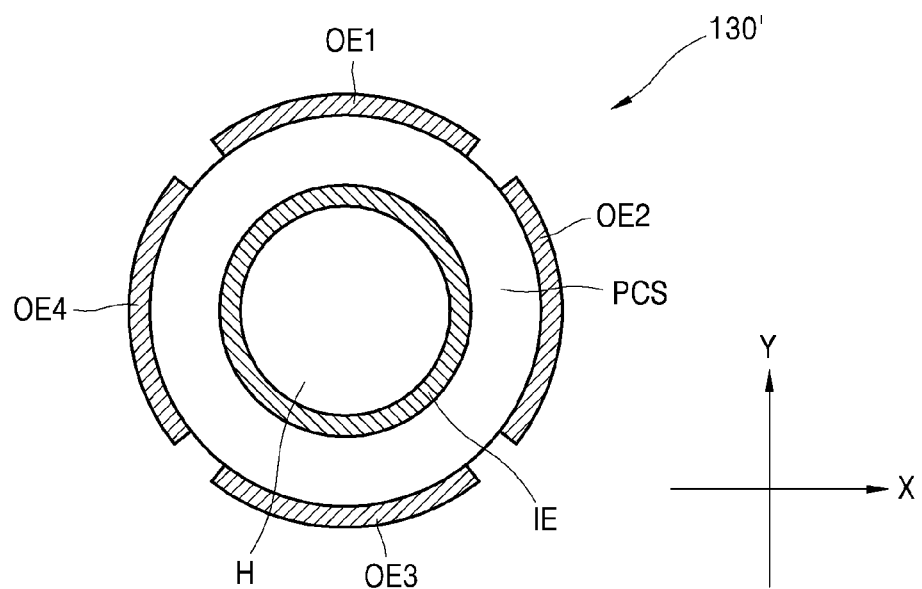
FIG. 4A is a cross-sectional view showing a structure of another exemplary actuator used in the fiber scanning projector in FIG. 1.
Figure 4B:
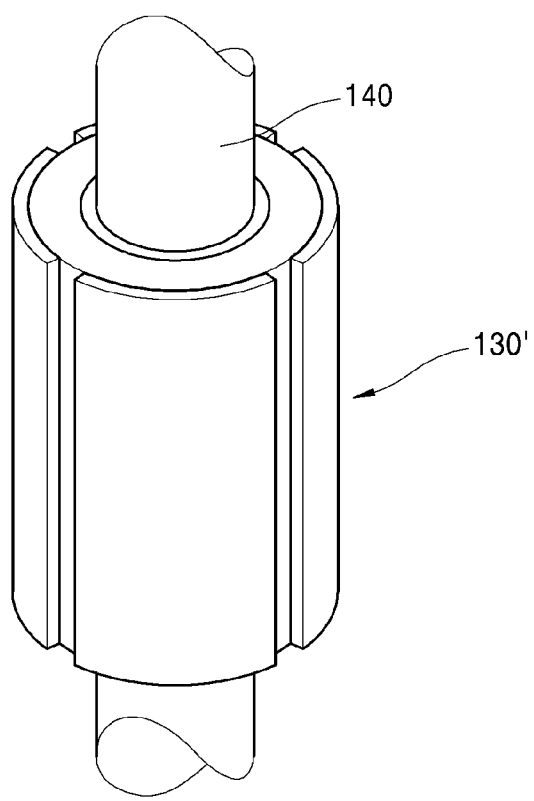
FIG. 4B is a perspective view showing an optical fiber bundle inserted into the actuator in FIG. 4A.

FIG. 4A is a cross-sectional view showing a structure of another exemplary actuator 130' used in the fiber scanning projector 100 in FIG. 1, and FIG. 4B is a perspective view showing a form in which the fiber bundle 140 is inserted into the actuator 130' in FIG. 4A.

Referring to FIG. 4A, the actuator 130' is a tube type having a through hole H. In detail, the actuator 130' includes a piezoelectric cylinder shell (PCS) formed of a piezoelectric material, an inner electrode IE having a cylinder shape and formed on an inner cylindrical surface of the PCS, and first to fourth outer electrodes OE1, OE2, OE3, and OE4 formed on an outer cylindrical surface of the PCS and separated from each other.

The PCS may be formed of a piezoelectric material, for example, PZT.

The inner electrode IE may be used as a common electrode, and one of the first to fourth outer electrodes OE1, OE2, OE3, and OE4 is selected and a voltage is applied thereto. Accordingly, an electric field may be formed in the PCS to cause modification.

The first to fourth external electrodes OE1, OE2, OE3, and OE4 may have, as shown, an arrangement relationship of rotational displacement by 90 degrees between adjacent electrodes. The first and third electrodes OE1 and OE3 may be used to induce modification in a Y-axis direction, and the second and fourth electrodes OE2 and OE4 may be used to induce modification in an X-axis direction.

FIGS. 5A to 5C illustrate exemplary shapes of an asymmetric structure 150 included in the fiber scanning projector 100 in FIG. 1.

The fiber scanning projector 100 may further include asymmetric structures 150 mounted on one side of the fiber bundle 140 and having different moments of inertia with respect to two rotational directions regarding 2-axis-driving directions of the fiber bundle 140.

The asymmetric structures 150 are suggested to separate two resonant frequencies when the fiber bundle 140 is 2-axis-driven. When the fiber bundle 140 is driven to perform a scanning operation, the actuator 130 drives the fiber bundle 140 at a resonant frequency of the scanning system or in a frequency band adjacent to the resonant frequency of the scanning system in order to obtain a maximum efficiency. In a scanning operation, when resonant frequencies are the same in two driving directions of the fiber bundle 140, it is difficult to obtain a precise scanning path due to an inter-axis coupling effect. For example, when the fiber bundle 140 is driven in one direction, it is difficult to obtain a precise straight path. Thus, resonant frequencies in two-axis directions may be differentiated by differentiating bending moments of inertia in two-axis directions from each other. In consideration of this, in the present exemplary embodiment, resonant frequencies in two-axis directions are differentiated by mounting asymmetric structures 150, which can differentiate the bending moments of inertia in two-axis directions from each other, on the fiber bundles 140.

The asymmetric structure 150 illustrated in FIG. 5, and shown as asymmetric structures 151, 152, and 153 in FIGS. 5A to 5C, may include a hole H or a groove through which the fiber bundle 140 penetrates in order to be easily mounted on the fiber bundle 140. In addition, the asymmetric structures 151, 152, and 153 may have a proper material and a shape to obtain desired resonant frequencies in two-axis directions. Even though a single asymmetric structure 150 is illustrated to be mounted on the fiber bundle 140 in the drawings, it is only exemplary and it is possible to include a plural number of asymmetric structures 150.

An asymmetric structure 151 in FIG. 5A shows an exemplary structure whose bending moments of inertia in two-axis directions are differentiated by having a shape of a symmetric cross section and an non-uniform thickness, and has a shape that a portion of a top surface of a cylinder having a through hole H penetrating a center portion thereof is etched. That is, the asymmetric structure 151 has a shape that a cut fan shape piece protrudes from the top surface of the cylinder having the through hole H therein. An angle or a thickness of the protruding fan piece may be determined in consideration of predetermined values of the resonant frequencies of two axis directions.

FIGS. 5B and 5C show exemplary structures whose bending moments of inertia in two-axis directions are differentiated by having a shape of an asymmetric cross section and a uniform thickness.

Referring FIG. 5B, an asymmetric structure 152 has a cylinder shape having a through hole H formed at a position deviated from the center portion thereof.

An asymmetric structure 153 in FIG. 5C has an elliptic cylinder shape having a through hole H at a center portion thereof.

Beside the descriptions above, an asymmetric structure may have a rectangular prism shape having a through hole H at a center portion, or a square prism shape having a through hole H at a position deviated from the center portion, or a fan prism having at a center angle portion, a groove allowing the fiber bundle 140 to be inserted into.

The synchronization controller 160 synchronizes the driving of the actuator 130 and the driving of the modulator 115. That is, when the modulator 115 provides a modulation signal to the light source 110 according to image information, the synchronization controller 160 controls 2-axis-driving of the actuator 130 in order for one end of the fiber bundle 140 to face a pixel position corresponding to the image information. As a screen S is scanned with a light corresponding to a pixel, an image is displayed on the screen S.

The varifocal lens 170 may have a focal length properly adjusted in consideration of a position of the screen S. The varifocal lens 170 may be, for example, a liquid lens having various structures which adjust a focal length by varying the curvature of a fluid, or a general zoom lens including a plurality of lens and varying a focal length by varying relative positions among lenses.

Figure 6:
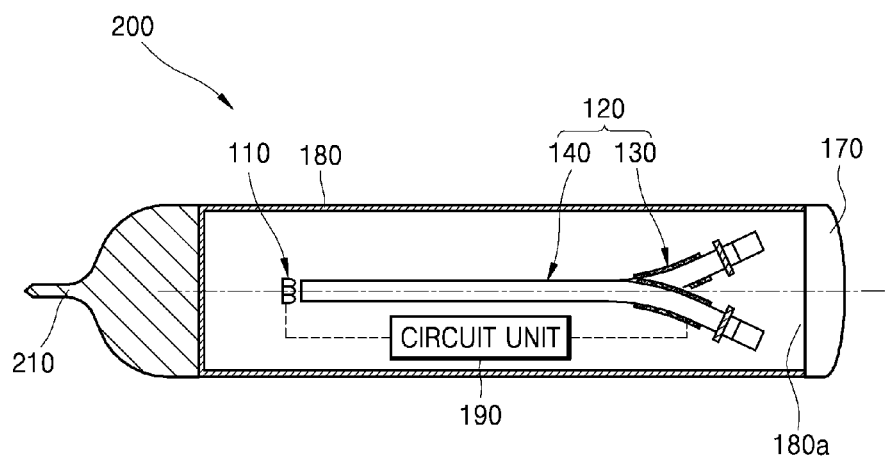
FIG. 6 is a cross-sectional view showing a schematic configuration of a fiber scanning projector according to another exemplary embodiment.

FIG. 6 is a cross-sectional view illustrating a schematic configuration of a fiber scanning projector 200 according to another exemplary embodiment.

The fiber scanning projector 200 in the present exemplary embodiment may further include a touch pen 210, as shown in FIG. 6, at one end of the case 180, that is, an opposite end of the light output portion 180a at which the varifocal lens 170 is arranged.

The present exemplary embodiment adopts a touch device included in a mobile device widely used recently as a case of a projector, thereby enabling convenient carrying of the projector and increasing availability thereof by using the mobile device together.

In the inner space of the case 180, a circuit unit 190 which forms the modulator 115 and the synchronization controller 160 may be arranged.

Alternatively, this circuit unit 190 may be embedded in a mobile device (not shown) separated from the case 180 to remotely drive the light source 110 and the actuator 130.

Figure 7:
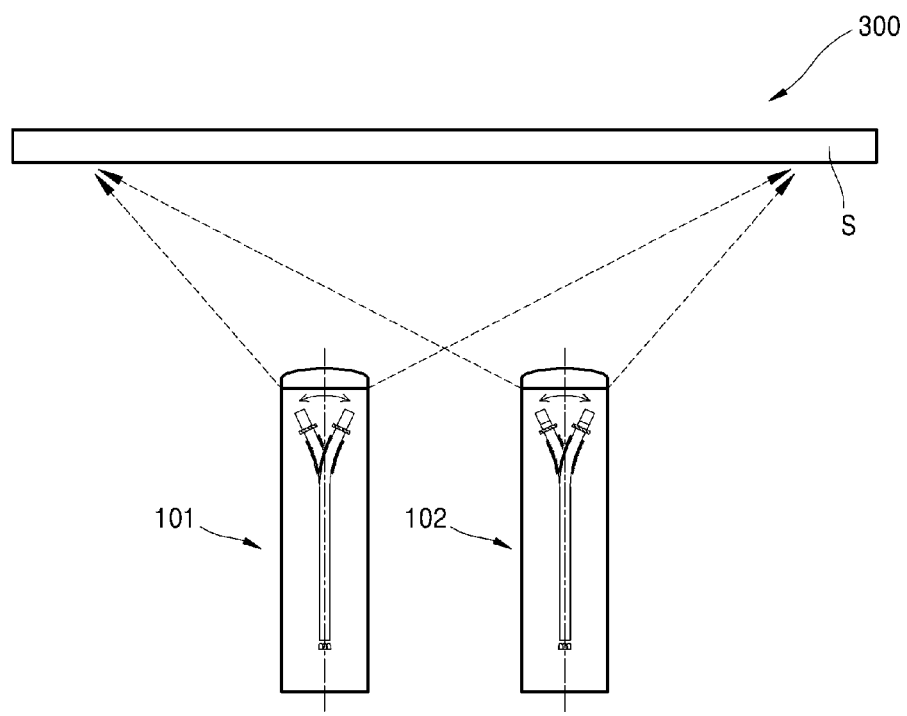
FIG. 7 illustrates a schematic configuration of a fiber scanning 3-dimensional (3D) projector according to an exemplary embodiment.

FIG. 7 illustrates a schematic configuration of a fiber scanning 3-dimensional (3D) projector 300 according to an exemplary embodiment.

The fiber scanning 3D projector 300 may include a plurality of fiber scanning projectors, and modulators of the plurality of fiber scanning projectors are configured to provide different image signals for 3D image formation, respectively.

For example, the fiber scanning 3D projector 300 may include a fiber scanning projector 101 for a left eye which forms a left eye image having first polarization, and a fiber scanning projector 102 for a right eye which forms a right eye image having second polarization. An image formed in this way can be perceived by a user wearing polarized glasses as a 3D image.

Figure 8:
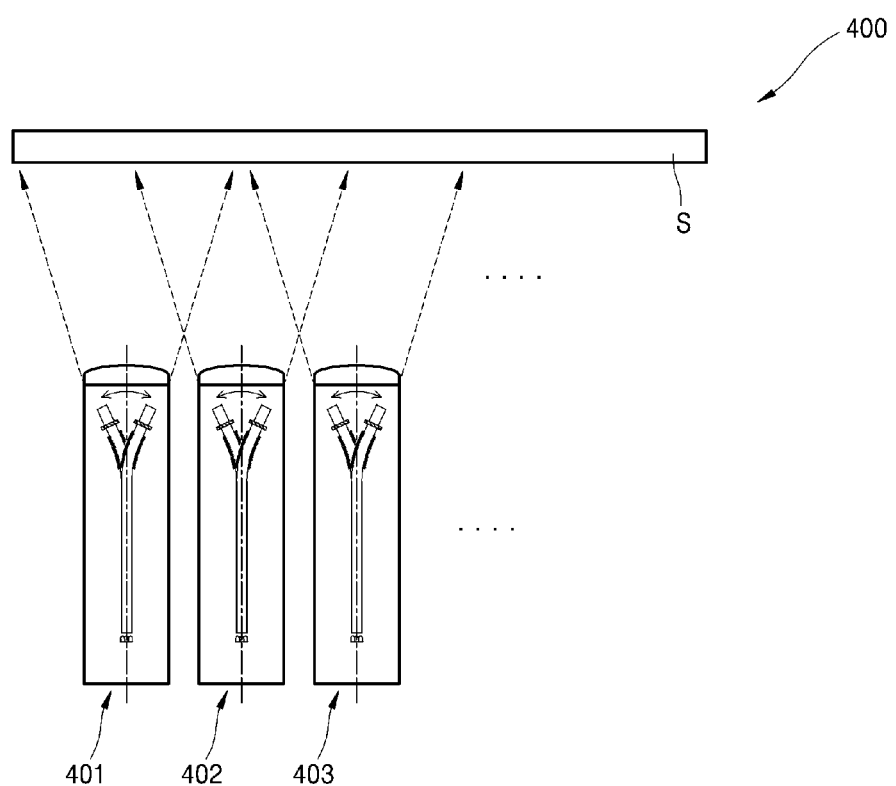
FIG. 8 illustrates a schematic configuration of a fiber scanning 3D projector according to another exemplary embodiment.

As the fiber scanning projector 101 for a left eye, and the fiber scanning projector 102 for right eye, the fiber scanning projector 100 described in relation to FIG. 1 may be employed. In addition, the fiber scanning projector 101 for a left eye, and the fiber scanning projector 102 for right eye may also be modified into, as exemplified in FIG. 6, a structure utilizing a touch pen FIG. 8 illustrates a schematic configuration of a fiber scanning 3D projector 400 according to another exemplary embodiment.

The fiber scanning 3D projector 400 according to the present exemplary embodiment may be formed of a plurality of fiber scanning projectors arrayed in the number of 3 or more, and the plurality of fiber scanning projectors are configured to project different view point images, and for example, may include a first fiber scanning projector 401, a second fiber scanning projector 402, and a third fiber scanning projector 403. The fiber scanning 3D projector 400 having this structure provides a multi-view point image. Accordingly a user can perceive a 3D image without wearing polarized glasses.

The fiber scanning projector 100 having a structure illustrated in FIG. 1 may be employed as the first fiber scanning projector 401, the second fiber scanning projector 402, or the third fiber scanning projector 403, or may be also modified to a structure using a touch pen, which is exemplified in FIG. 5.

As described above, according to the one or more of the above exemplary embodiments, a fiber scanning projector has a high light efficiency by using a scheme of scanning each pixel with a plurality of monochromatic light sources, and may be implemented in a subminiature type by adopting a 2-axis-driving fiber scanning scheme.

The fiber scanning projector may also have a sufficient size to be embedded, for example, in a touch unit for a touch pad so as to be easily portable.

In addition, the fiber scanning projector may be used as a 3D projector by being arrayed in plural and projecting different view point images.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

What is claimed is:

1. A fiber scanning projector comprising:
    a light source comprising a plurality of monochromatic light sources;
    a modulator configured to provide a modulation signal to the light source according to image information;
    a scanner configured to scan a screen with a light emitted from the light source and configured to be controlled according to the modulation signal, the scanner comprising a fiber bundle and an actuator which 2-axis-drives the fiber bundle;
    a synchronization controller configured to synchronize driving of the actuator and driving of the modulator; and
    a varifocal lens arranged on an optical path of light emitted from the scanner.

2. The fiber scanning projector according to claim 1, wherein the actuator comprises:
    a plurality of piezoelectric strips configured to be adhered to a surface of the fiber bundle; and
    a power supply configured to supply an electric signal to selected some of the plurality of piezoelectric strips.

3. The fiber scanning projector according to claim 2, wherein the plurality of piezoelectric strips comprise:
    a pair of first piezoelectric strips which face each other on a side surface of the fiber bundle to modify one end of the fiber bundle in a first direction; and
    a pair of second piezoelectric strips which are rotationally displaced from the pair of first piezoelectric strips by 90 degrees to modify the one end of the fiber bundles in a second direction perpendicular to the first direction.

4. The fiber scanning projector according to claim 3, wherein the pair of first piezoelectric strips and the pair of second piezoelectric strips respectively have a piezoelectric film, and first electrodes and second electrodes are respectively formed on both surfaces of the piezoelectric film.

5. The fiber scanning projector according to claim 1, wherein the actuator has a tube form which has a through hole through which the fiber bundle passes.

6. The fiber scanning projector according to claim 5, wherein the actuator comprises:
    a piezoelectric cylinder shell formed of a piezoelectric material;
    an inner electrode which has a cylinder shell shape formed on an inner cylindrical surface of the piezoelectric cylinder shell; and
    four outer electrodes formed on an outer cylindrical surface of the piezoelectric cylinder shell and separated from each other.

7. The fiber scanning projector according to claim 1, further comprising:
    a structure mounted on one side of the fiber bundle and which has different moments of inertia with respect to two directions of the 2-axis-driving.

8. The fiber scanning projector according to claim 7, wherein the structure has a cylinder shape, and has at least one of a hole or a groove through which the fiber bundle passes.

9. The fiber scanning projector according to claim 7, wherein the structure has a symmetric cross-sectional shape and a non-uniform thickness.

10. The fiber scanning projector according to claim 7, wherein the structure has an asymmetric cross-sectional shape and a uniform thickness.

11. The fiber scanning projector according to claim 7, wherein the structure has a cylinder shape having a through hole formed at a position deviated from a center portion.

12. The fiber scanning projector according to claim 7, wherein the structure has an elliptic cylinder shape and has a through hole formed at a center portion.

13. The fiber scanning projector according to claim 7, wherein the structure is formed of a silicon material.

14. The fiber scanning projector according to claim 1, further comprising a case which has an inner space in which the light source and the scanner are disposed, and an output portion which outputs a light from the scanner formed on one end of the case.

15. The fiber scanning projector according to claim 14, wherein the varifocal lens is mounted on the output portion.

16. The fiber scanning projector according to claim 14, further comprising a touch pen for a touch pad, wherein the touch pen is located on an end of the case that is opposite to the output portion of the case.

17. The fiber scanning projector according to claim 14, wherein a circuit unit configuring the modulator and the synchronization controller is arranged in the inner space of the case.

18. The fiber scanning projector according to claim 14, wherein a circuit unit configuring the modulator and the synchronization controller is embedded in a mobile device which is separated from the case, and remotely drives the light source and the actuator.

19. A fiber scanning 3-dimensional (3D) image projector comprising:
   a plurality of fiber scanning projectors, and
   wherein modulators of the plurality of fiber scanning projectors respectively provide different image signals for forming a 3D image,
   wherein each of the plurality of fiber scanning projectors comprise;
   a light source comprising a plurality of monochromatic light sources;
   a modulator configured to provide a modulation signal to the light source according to image information;
   a scanner configured to scan a screen with a light emitted from the light source and configured to be controlled according to the modulation signal, the scanner comprising a fiber bundle and an actuator which 2-axis-drives the fiber bundle; and
   a synchronization controller configured to synchronize driving of the actuator and driving of the modulator.

* * * * *